US012514527B2

(12) United States Patent
Hofmann et al.

(10) Patent No.: US 12,514,527 B2
(45) Date of Patent: Jan. 6, 2026

(54) METHODS AND SYSTEMS FOR PROVIDING VESSEL WALL-RELATED DATA

(71) Applicant: Siemens Healthcare GmbH, Erlangen (DE)

(72) Inventors: Bernd Hofmann, Erlangen (DE); Matthias Lichy, Nuremberg (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 428 days.

(21) Appl. No.: 18/146,657

(22) Filed: Dec. 27, 2022

(65) Prior Publication Data

US 2023/0210487 A1 Jul. 6, 2023

(30) Foreign Application Priority Data

Dec. 30, 2021 (DE) .................... 10 2021 215 112.4

(51) Int. Cl.
*A61B 6/50* (2024.01)
*A61B 6/00* (2006.01)
*A61B 6/03* (2006.01)
*G06T 7/00* (2017.01)

(52) U.S. Cl.
CPC .............. *A61B 6/504* (2013.01); *A61B 6/032* (2013.01); *A61B 6/507* (2013.01); *A61B 6/5217* (2013.01); *G06T 7/0012* (2013.01); *G06T 2207/10081* (2013.01); *G06T 2207/30104* (2013.01)

(58) Field of Classification Search
CPC ......... A61B 6/504; A61B 6/032; A61B 6/507; A61B 6/5217; A61B 6/4241; A61B 6/482; A61B 6/481; G06T 7/0012; G06T 2207/10081; G06T 2207/30104; G06T 2207/30101; G06T 2207/30172; G06T 2207/10101
See application file for complete search history.

(56) References Cited

U.S. PATENT DOCUMENTS

| | | | |
|---|---|---|---|
| 11,094,058 B2 | 8/2021 | Buckler et al. | |
| 2010/0156898 A1* | 6/2010 | Voros ................. | A61B 5/02007 345/419 |
| 2013/0243294 A1* | 9/2013 | Ralovich ............. | G06T 7/0012 382/131 |
| 2020/0226749 A1 | 7/2020 | Freiman et al. | |
| 2020/0375564 A1 | 12/2020 | Freiman et al. | |
| 2021/0019882 A1 | 1/2021 | Hofmann et al. | |

FOREIGN PATENT DOCUMENTS

| | | |
|---|---|---|
| CN | 110461235 A | 11/2019 |
| DE | 102019210473 A1 | 1/2021 |
| DE | 102019220579 A1 | 4/2021 |
| EP | 3420902 A1 | 1/2019 |

* cited by examiner

*Primary Examiner* — Siamak Harandi
(74) *Attorney, Agent, or Firm* — Harness, Dickey & Pierce, P.L.C.

(57) ABSTRACT

One or more example embodiments of the present invention relates to a method for providing vessel wall-related data. The method includes receiving spectral computed tomography data of an examination region, the examination region having a vessel; calculating a representation of a vessel wall of the vessel and at least one parameter map of the examination region based on the spectral computed tomography data; calculating the vessel wall-related data based on the representation of the vessel wall and the at least one parameter map of the examination region; and providing the vessel wall-related data.

20 Claims, 5 Drawing Sheets

FIG 4
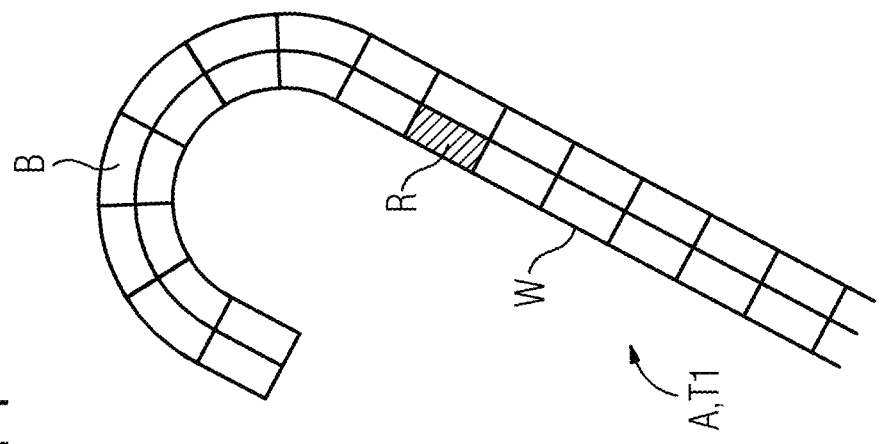
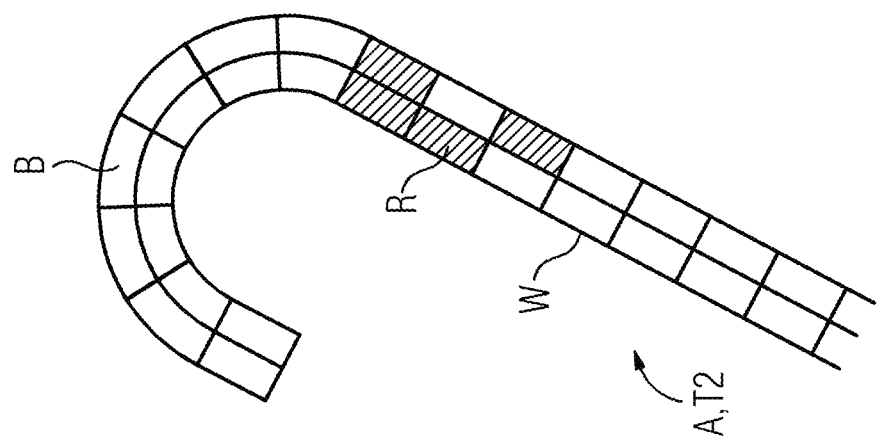
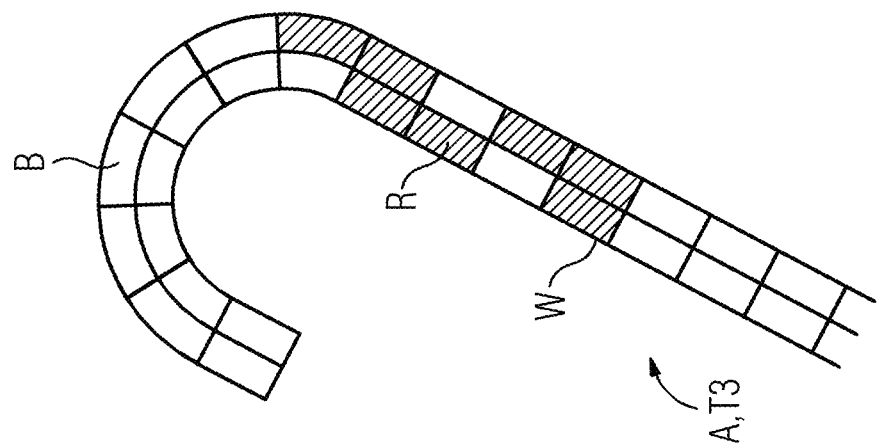

METHODS AND SYSTEMS FOR PROVIDING VESSEL WALL-RELATED DATA

CROSS-REFERENCE TO RELATED APPLICATION(S)

The present application claims priority under 35 U.S.C. § 119 to German Patent Application No. 10 2021 215 112.4, filed Dec. 30, 2021, the entire contents of which are incorporated herein by reference.

FIELD

One or more example embodiments of the present invention relates to a method for providing vessel wall-related data. One or more example embodiments of the present invention relates, moreover, to a data processing system and to a medical imaging system.

RELATED ART

The elasticity of the vessel wall constitutes a fundamental basis of hemodynamic conditions in the whole of the vessel system. This is particularly significant in the case of central vessels (air chamber function) (Aorta thoracica, abdominalis, Truncus brachiocephalicus, Arteria carotis, A. iliaca). It plays a less pronounced role in the case of smaller vessels. In the case of cerebral vessels, instead of the air chamber function it is autoregulation which is relevant, and this is likewise dependent on the elasticity of the vessel wall.

Different diseases have an effect on the wall structure and therewith on the elasticity thereof and, moreover, also on the flow conditions in the vessel. Inflammatory processes (for example arteriosclerosis), metabolic disorders (for example hyperlipidemia) should be distinguished in this connection, and in rare cases, genetic changes such as a collagen synthesis disorder (for example Marfan syndrome).

In the case of very small vessels or special applications such as the coronaries, changes in the elasticity of the wall are rarely relevant with regard to the flow conditions. It is precisely in the case of interventions of larger vessels where it is not just the degree of stenosis that has to be incorporated in the decision on treatment but also other parameters, such as the condition of the wall and degree of inflammation. Aneurysmatic changes also often occur in this connection in which the exact condition of the wall and its extent are relevant to the decision on treatment.

In the case of non-invasive assessment of the vessel wall, physiological processes make assessment difficult. For example, the (pseudo) wall thickening as an snapshot of the pulsation wave. Furthermore, the above-mentioned problems require long-term mapping of the vessel situation.

In experimental studies the elasticity can be derived from the pressure conditions in the vessel system. This is not possible, or is possible to only a very limited extent, in the clinical situation.

In fluoroscopy a change in the vessel wall is presented only indirectly via the change in the vessel lumen following the administration of contrast medium. Pronounced pathologies, but also calcifications, can be identified in this case. A correct statement on the condition of the vessel wall and its elasticity is scarcely possible, however. A statement about the flow relevance of stenoses is possible by way of costly and invasive FFR methods.

In intraluminal ultrasound, changes in the wall in the case of smaller vessels may be resolved in detail for short sections. Elasticity measurements are not possible, or are possible to only a limited extent. Calcifications constitute a significant limitation owing to the physical principle of ultrasound. Conventional ultrasound makes flow measurements possible but supplies only limited information on the change in elasticity of the vessel wall. Calcifications limit the significance just like the anatomical localization of deeper vessel sections.

Magnetic resonance tomography (MRT) can represent information about inflammatory processes (late enhancement, water retention), flow conditions and wall elasticity. Furthermore, like computed tomography (CT), MRT makes representation of stenoses and the quantification of the vessel lumen possible. MRT makes a detailed flow analysis possible in larger vessels and therewith conclusions about the shear forces of the vessel wall. A detailed assessment of the vessel wall is not possible therewith, however.

Examination times for the individual issues and the complexity of implementation and robustness of the results make broad application difficult and is used only in specialized set-ups and issues in the case of individual treatment (for example Marfan syndrome). Certain anatomical sections and areas having calcifications are often excluded from analysis due to the vulnerability to susceptibility artifacts. Furthermore, MRT has issues with contraindicated for certain patients (for example pacemakers). The information collected via MRT can be used qualitatively for diagnosis, but cannot readily contribute to quantification.

Inflammatory processes in particular are captured with a high level of sensitivity via nuclear-medicine examinations (for example FDG PET). Spatial and temporal resolution, which make an accurate statement difficult, are limiting here. Accurate statements about the morphology are scarcely possible and have to be obtained in hybrid imaging using CT or MRT. The information collected via MI can be used qualitatively for diagnosis, but cannot readily contribute to quantification.

In conventional computed tomography, calcifications can generally be represented but accurate assessment thereof is made difficult due to blooming effects. These are dependent on the chosen scanning parameters, but can be partially corrected by way of comparison tables (see AGATSON Score). Administration of contrast medium is necessary owing to the slight differences in density between blood and vessel wall. A more accurate analysis of the vessel wall is often only inadequately possible owing to the limited resolution. Subtraction angiography for assessment of the walls, for example via late enhancement, is possible only rarely owing to the above-mentioned overlaying with physiological influences.

SUMMARY

One or more example embodiments of the present invention enable an alternative to conventional provision of vessel wall-related data. Each subject matter of an independent claim achieves provides this feature.

According to one or more example embodiments, a method for providing vessel wall-related data includes receiving spectral computed tomography data of an examination region, the examination region having a vessel; calculating a representation of a vessel wall of the vessel and at least one parameter map of the examination region based on the spectral computed tomography data; calculating the vessel wall-related data based on the representation of the vessel wall and the at least one parameter map of the examination region; and providing the vessel wall-related data.

According to one or more example embodiments, the vessel is a blood vessel.

According to one or more example embodiments, the calculating the vessel wall-related data calculates the vessel wall-related data based on an overlaying of the representation of the vessel wall and the at least one parameter map.

According to one or more example embodiments, the representation of the vessel wall is based on a transformation in which a first portion of a transformed representation of the vessel wall is assigned to a first portion of the vessel wall and a second portion of the transformed representation of the vessel wall is assigned to a second portion of the vessel wall, an azimuthal arrangement of the first portion of the transformed representation relative to the second portion of the transformed representation is substantially identical to the azimuthal arrangement of the first portion of the vessel wall relative to the second portion of the vessel wall, the first portion of the transformed representation is radially further out than the second portion of the transformed representation if the first portion of the vessel wall is further downstream in relation to a center line of the vessel than the second portion of the vessel wall, or the first portion of the transformed representation is radially further out than the second portion of the transformed representation if the first portion of the vessel wall is further upstream in relation to a center line of the vessel than the second portion of the vessel wall.

According to one or more example embodiments, the at least one parameter map of the examination region comprise at least one of a fat map or a water map.

According to one or more example embodiments, the at least one parameter map of the examination region comprises at least one of a calcification map, a density map or an iodine map.

According to one or more example embodiments, the spectral computed tomography data comprises contrast medium-assisted spectral computed tomography angiography data of the vessel, and the method further comprises calculating the representation of the vessel wall based on the contrast medium-assisted spectral computed tomography angiography data.

According to one or more example embodiments, the calculating the vessel wall-related data includes, for each portion of a plurality of portions of the vessel wall, comparing an assigned parameter value from the at least one parameter map to a threshold value for the at least one parameter map, the vessel wall-related data for each portion of the plurality of portions of the vessel wall including a result of the respective comparison.

According to one or more example embodiments, the method includes generating a wall elasticity model based on at least one of the vessel wall-related data, the wall elasticity model relating to an elasticity of the vessel wall of the vessel.

According to one or more example embodiments, the method includes generating a blood flow model based on the vessel wall-related data, the blood flow model relating to a blood flow through the vessel.

According to one or more example embodiments, the method includes determining a calcified vessel section based on the blood flow model and a calcification map, the calcified vessel section being upstream of a dissection of the vessel or a vascular suture of the vessel, and the calcification map being part of the at least one parameter map.

According to one or more example embodiments, a data processing system configured to provide vessel wall-related data includes a data interface; and a processor, the processor configured to cause the data processing system to receive spectral computed tomography data of an examination region, the examination region having a vessel, calculate a representation of a vessel wall of the vessel and at least one parameter map of the examination region based on the spectral computed tomography data, calculate the vessel wall-related data based on the representation of the vessel wall and the at least one parameter map of the examination region, and provide the vessel wall-related data.

According to one or more example embodiments, a medical imaging system includes the data processing system and a computed tomography device configured to capture the spectral computed tomography data.

According to one or more example embodiments, a non-transitory computer program product comprises instructions, when executed by a computer, cause the computer to perform a method according to one or more example embodiments.

According to one or more example embodiments, a non-transitory computer-readable storage medium comprises instructions, when executed by a computer, cause the computer to perform a method according to one or more example embodiments.

BRIEF DESCRIPTION OF THE DRAWINGS

Example embodiments of the present invention will be illustrated below using exemplary embodiments with reference to the accompanying Figures. The representation in the Figures is schematic, highly simplified and not necessarily to scale.

FIG. 4 shows a representation of vessel wall-related data of the same vessel for a plurality of successive instants.

DETAILED DESCRIPTION

Figure 1:
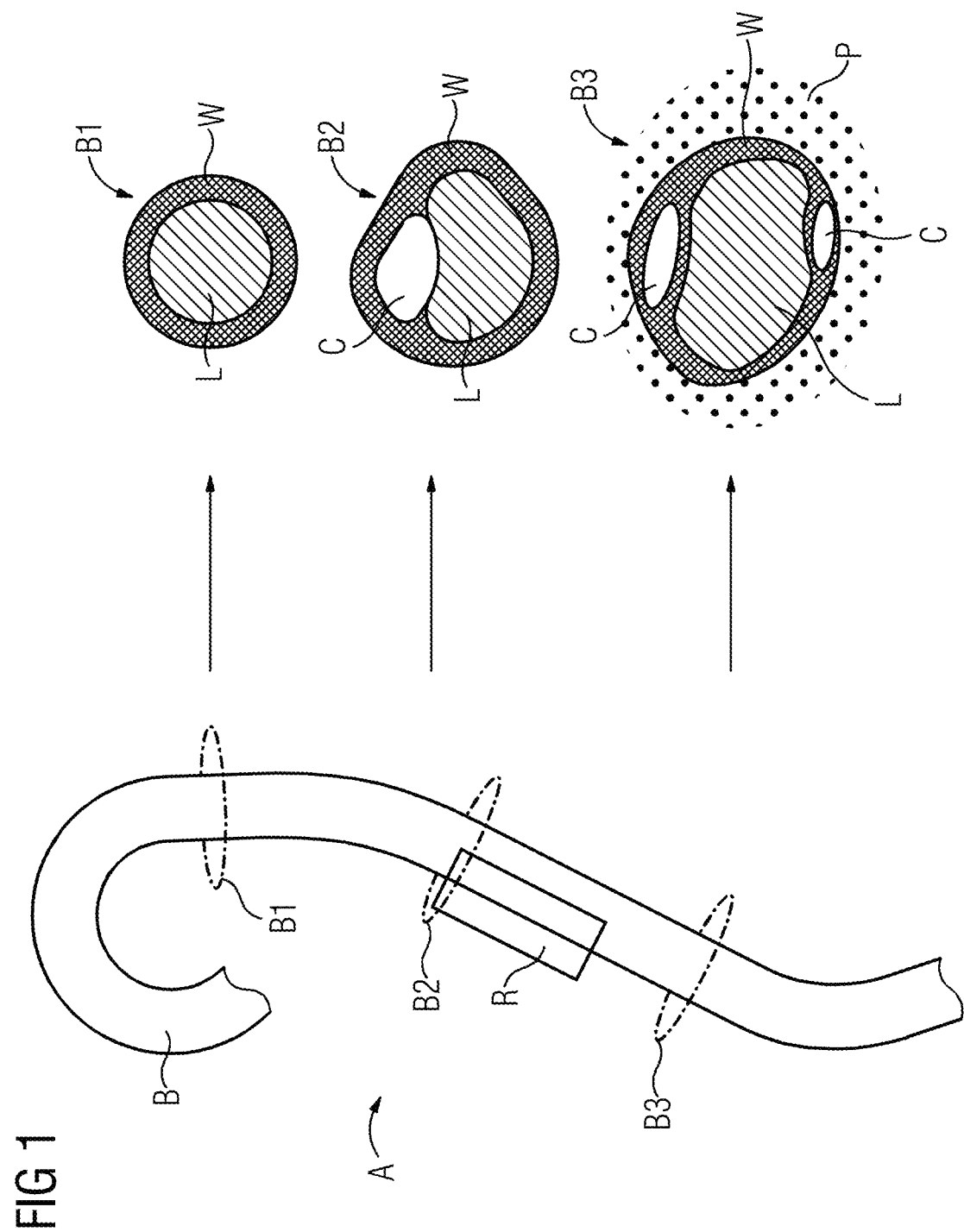
FIG. 1 shows segmenting of a vessel cross-section for a plurality of positions along a vessel according to one or more example embodiments.

One or more example embodiments of the present invention relates to a method for providing vessel wall-related data, the method comprising:
receiving spectral computed tomography data of an examination region, wherein the examination region has a vessel,
calculating a representation of a wall of the vessel and at least one parameter map of the examination region on the basis of the spectral computed tomography data,
calculating the vessel wall-related data on the basis of the representation of the vessel wall and the at least one parameter map of the examination region,
providing the vessel wall-related data.

The spectral computed tomography data can be captured for example on the basis of photon-counting computed tomography and/or dual-energy computed tomography, in particular dual-source computed tomography.

The at least one parameter map can assign a parameter value in particular to each portion of a plurality of portions of the examination region. Portions of the examination region can be for example image points respectively or comprise a plurality of connected image points. The parameter value assigned to a portion can be for example a mean of the parameter values, which are assigned to the image points of the portion. Image points can be for example 2D image points (pixels) or 3D image points (voxels, volume elements).

The vessel wall-related data, the representation of the vessel wall and the at least one parameter map can be structured in particular in the form of two-dimensional image data or three-dimensional image data respectively.

The vessel wall-related data can relate for example to an edema in the vessel wall and/or a distribution of calcifications and/or inflammations on the vessel wall. In particular, the vessel wall-related data can relate to an assignment of calcifications and/or inflammations to sections of the vessel wall.

One embodiment provides that the vessel is a blood vessel. The representation of the vessel wall can be for example a vessel wall model, in particular a numerical vessel wall model. In particular, the representation of the vessel wall can be used as a mask for the at least one parameter map. The representation of the vessel wall and the at least one parameter map of the examination region can be calculated for example on the basis of a material breakdown and/or multi-compartment segmenting.

One embodiment provides that the vessel wall-related data is calculated on the basis of an overlaying of the representation of the vessel wall and the at least one parameter map.

A correction of movement artifacts is not necessary with the overlaying of the representation of the vessel wall and the at least one parameter map since the representation of the vessel wall and the at least one parameter map are based on the same spectral projection data. The acquisition of the information for the representation of the vessel wall and the acquisition of the information for the at least one parameter map thus take place simultaneously, in particular in the form of the same spectral projection dataset. The representation of the vessel wall and the at least one parameter map thus relate to the same effective acquisition instant.

One embodiment provides that the representation of the vessel wall is based on a transformation in which a first portion of a transformed representation of the vessel wall is assigned to a first portion of the vessel wall and a second portion of the transformed representation of the vessel wall is assigned to a second portion of the vessel wall, wherein, in particular in relation to a center line of the vessel, an azimuthal arrangement of the first portion of the transformed representation relative to the second portion of the transformed representation is substantially identical, in particular identical, to the azimuthal arrangement of the first portion of the vessel wall relative to the second portion of the vessel wall.

The transformation takes place in such a way that the first portion of the transformed representation is situated radially further out than the second portion of the transformed representation if the first portion of the vessel wall is situated further downstream in relation to a center line of the vessel than the second portion of the vessel wall, or in such a way that the first portion of the transformed representation is situated radially further out than the second portion of the transformed representation if the first portion of the vessel wall is situated further upstream in relation to a center line of the vessel than the second portion of the vessel wall.

One embodiment provides that the at least one parameter map of the examination region comprises a fat map and/or a water map.

The density map can relate in particular to an X-ray density, for example a standardized X-ray density, and/or assign a CT value, for example on a Hounsfield scale, to each image point of a plurality of image points. The at least one parameter map, in particular in the form of the calcification map and/or the density map, can be calculated for example on the basis of monoenergetic imaging. In particular a calcification map with minimal blooming can be calculated therewith.

One embodiment provides that the at least one parameter map of the examination region comprises a calcification map and/or a density map and/or a contrast medium map, in particular an iodine map.

In particular in the case of a computed tomography examination, which relates to a late enhancement of contrast medium (late enhancement), a region on the vessel wall, in which an inflammatory process is active, can be ascertained on the basis of an iodine map.

One embodiment provides that the spectral computed tomography data comprises contrast medium-assisted spectral computed tomography angiography data of the vessel, wherein the representation of the vessel wall is calculated on the basis of the contrast medium-assisted spectral computed tomography angiography data.

For example, virtual non-contrast mage data, which relates to the vessel, can be calculated on the basis of the contrast medium-assisted spectral computed tomography angiography data, with the representation of the vessel wall being calculated on the basis of the virtual non-contrast image data.

For example, contrast medium information, in particular in the form of iodine information and/or intraluminal contrast medium information, which is contained in the contrast medium-assisted spectral computed tomography angiography data, can be used for calculating the representation of the vessel wall and/or for calculating the vessel wall-related data.

For example, it can be provided that vessel sections of the vessel are automatically segmented on the basis of the contrast medium-assisted spectral computed tomography angiography data and/or that a representation of an internal boundary surface of the vessel wall is calculated on the basis of the contrast medium-assisted spectral computed tomography angiography data. The representation of the vessel wall can be calculated in particular on the basis of the automatic segmenting of the vessel sections of the vessel and/or on the basis of the representation of the internal boundary surface of the vessel wall.

Furthermore, stenosis and/or plaque can be assessed, in particular quantitatively assessed (on the basis of HU values) on the basis of segmenting of the lumen of the vessel. In addition, a warping of the vessel (straight-line view) along a centerline in the region a stenosis can be calculated. In addition, the true vessel lumen (true lumen) can be ascertained in this way in the case of a dissection.

One embodiment provides that the vessel wall-related data is calculated in that for each portion of a plurality of portions of the vessel wall, a parameter value, which the at least one parameter map assigns to this portion, is compared with a threshold value for the at least one parameter map respectively, wherein the vessel wall-related data for each portion of the plurality of portions of the vessel wall comprises a result of the respective comparison.

Based on a comparison with a respective threshold value, a defined slice or a defined volume of the vessel wall can be segmented for example for each parameter. Statements in percentage terms about a degree of a calcification, a size of an edema and/or the presence of inflammatory processes can thus be ascertained automatically and/or (semi-) quantitatively.

The parameterization of the vessel wall thus created can be overlaid on the representation of the vessel wall in an image. The changes in the vessel wall, which precede or follow a stenosis and/or plaque, can be identified more clearly therewith, so they can be taken into account more effectively for example when planning a stent.

The vessel wall can for example be segmented therewith in a manner similar to in a Bull's-Eye representation of the heart. Processes in the vessel wall can be identified and assessed hereby in a static two-dimensional, irrespective of at which position along the center line of the vessel these processes are located.

One embodiment provides that a wall elasticity model, which relates to an elasticity of the wall of the vessel, is generated on the basis of the vessel wall-related data and/or adapted to the vessel wall-related data.

It is not necessary for the elasticity of the vessel wall to be directly determined in this case. Instead, clinically relevant information, which can influence the elasticity of the vessel wall, can be captured in the form of the vessel wall-related data. The clinically relevant information, for example an edema formation in the vessel wall, a thickening of the vessel wall, a calcification of the vessel wall and/or an increase in density or thickness of the vessel wall caused by fibrotic processes (for example in the form of a retroperitoneal fibrosis), can then be used for assessing changes in elasticity, in particular relative and/or absolute changes in elasticity.

One embodiment provides that a blood flow model, which relates to a blood flow through the vessel, is generated on the basis of the vessel wall-related data and/or is adapted to the vessel wall-related data.

The blood flow model can be for example a Fractional Flow Reserve (FFR) model and/or a numerical model. The modeling of the blood flow also opens up possibilities for achieving an evaluation of risk structures (for example endoprosthesis/vessel wall transition or in the case of anastomoses) by way of imaging. Pathological changes in the vessel wall play a significant role in the regulation of the blood flow in the majority of vessel systems.

In particular, it can be provided that a calcified vessel section, which is situated upstream of a dissection of the vessel or a vascular suture of the vessel, is ascertained on the basis of the blood flow model and the calcification map, in particular is ascertained semi-automatically or automatically.

For example, vulnerable vessel wall portions in the region of a vascular suture and/or anastomosis can be evaluated, the success of a dilatation treatment, including the load-bearing capacity of the vessel wall can be assessed, the development of a collagen disorder and/or a rheumatic or other inflammatory vascular disease can be controlled and/or a risk of scar-induced stenosis following an intervention can be evaluated on the basis of the blood flow model. Furthermore, a differentiation and/or quantification of early and/or late forms of inflammatory vascular wall diseases is possible.

One advantage of the methods described here is the fact that different information about the represented vessel wall can be obtained at an acquisition instant. This dispenses with artifacts, which are produced due to the fact that various items of information are collected and linked at different instants.

One or more example embodiments of the present invention relates, moreover, to a data processing system for providing vessel wall-related data, having a data interface and a processor, wherein the data processing system is adapted to carry out an inventive method.

One or more example embodiments of the present invention relates, moreover, to a medical imaging system, having the inventive data processing system and a computed tomography device for capturing the spectral computed tomography data.

The computed tomography device can be adapted for example for capturing spectral computed tomography data on the basis of photon-counting computed tomography and/or dual-energy computed tomography, in particular dual-source computed tomography.

The method for providing vessel wall-related data can be a computer-implemented method in particular.

One or more example embodiments of the present invention relates, moreover, to a computer program product, comprising instructions, which when the instructions are executed by a computer, cause the computer to carry out the inventive method.

The computer program product can be for example a computer program or comprise at least one additional component part aside from the computer program. The at least one additional component part of the computer program product can be designed as hardware and/or software.

The computer program product can have for example a storage medium on which at least part of the computer program product is stored, and/or have a key for authentication of a user of the computer program product, in particular in the form of a dongle. The computer program product and/or the computer program can have for example a Cloud application program, which is designed for distributing the instructions among different processing units, in particular different computers, of a Cloud computing system, with each of the processing units being designed for executing one or more of the instruction(s).

One or more example embodiments of the present invention relates, moreover, to a computer-readable storage medium, comprising instructions, which, when the instructions are executed by a computer, cause the computer to carry out the inventive method.

For example, the computer program product according to one of the embodiments which are disclosed in this application, and/or the computer program according to one of embodiments which are disclosed in this application can be stored on the computer-readable storage medium. The computer-readable storage medium can be for example a memory stick, a hard drive or another data carrier, which can in particular be releasably connected to a computer or be permanently integrated in a computer. The computer-readable storage medium can form for example a sector of a storage system, with the data processing system being connected to the storage system via the data interface.

The data processing system can have for example one or more component(s) in the form of hardware and/or one or more component(s) in the form of software. The data processing system can be formed for example at least partially by a Cloud computing system. The data processing system can be and/or have for example a Cloud computing system, a computer network, a computer, a tablet computer, a smartphone or the like or a combination thereof.

The hardware can interact for example with software and/or be configured via software. The software can be executed for example via the hardware. The hardware can be for example a storage system, an FPGA System (Field Programmable Gate Array), an ASIC system (Application Specific Integrated Circuit), a microcontroller system, a processor system and combinations thereof. The processor system can have for example a microprocessor and/or a plurality of interacting microprocessors.

The steps of the method can be carried out, in particular in the form of calculations, for example in the processor of the data processing system. Calculating, for example calculating the representation of the vessel wall and/or calculating the at least one parameter map and/or calculating the vessel wall-related data, can take place in particular by applying an algorithm, for example a trained machine learning algorithm, to that data on which the calculation is based.

Data can be transferred between components of the medical imaging system for example via a suitable data transfer interface respectively. The data transfer interface for data transfer to and/or from a component of the medical imaging system can be implemented at least partially in the form of software and/or at least partially in the form of hardware. The data transfer interface can be designed for example for storing data in and/or for reading-in data from a sector of a storage system, it being possible for one or more component(s) of the medical imaging system to access this sector of the storage system.

Data, in particular the spectral computed tomography data, can be received for example by receiving a signal, which the data carries, and/or by reading-in the data, in particular from a computer-readable storage medium. Data, in particular the vessel wall-related data, the wall elasticity model and/or the blood flow model, can be provided for example by transferring a signal, which carries the data, and/or by writing the data into a computer-readable storage medium and/or by displaying the data on a screen.

Within the scope of one or more example embodiments of the present invention, features, which are described in relation to different embodiments of the invention and/or different categories of claims (method, use, apparatus, system, arrangement, etc.), can be combined to form further embodiments of the invention. For example, a claim, which relates to an apparatus, can also be developed with features, which are described or claimed in connection with a method, and vice versa. Functional features of a method can be carried out by appropriately designed concrete component(s). Use of the indefinite article "a" or "an" does not preclude the relevant feature from also being present multiple times. In the context of the present application the expression "on the basis of" can in particular be understood within the meaning of the expression "using". In particular, wording, as a consequence of which a first feature is calculated (alternatively: ascertained, generated, etc.) on the basis of a second feature, does not preclude the first feature from also being calculated (alternatively: ascertained, generated, etc.) on the basis of a third feature.

FIG. 1 shows segmenting of a vessel cross-section for a plurality of positions B1, B2, B3 along the vessel B in the examination region A on the basis of spectral computed tomography data. The vessel B is for example a blood vessel. The vessel wall W surrounds the vessel lumen L and the calcification C. Outside of the vessel B a peripheral region P adjoins the vessel wall W, which is enhanced with contrast medium, for example is enhanced with contrast medium owing to an inflammatory process.

Figure 2:
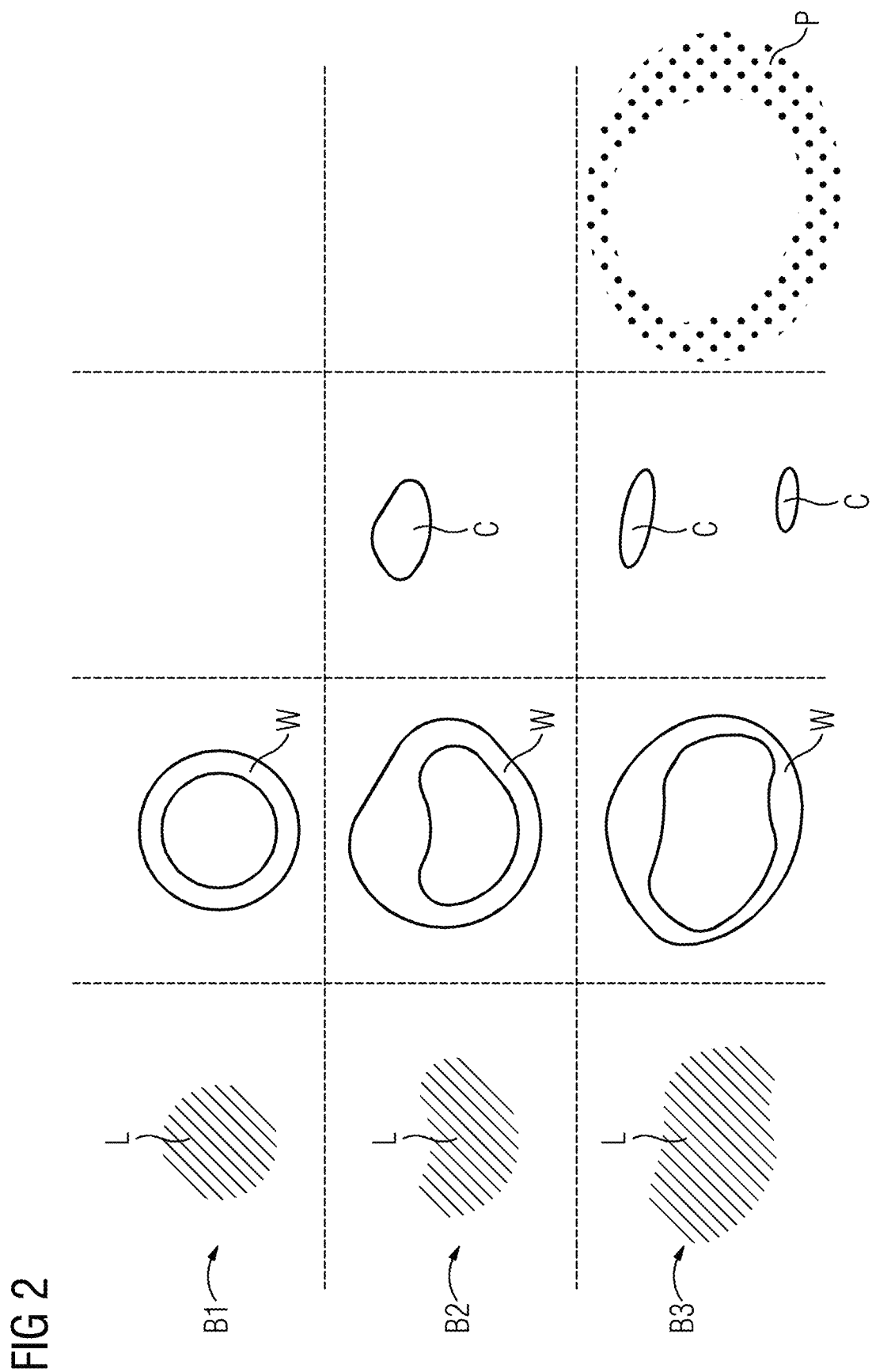
FIG. 2 shows a result of a material breakdown of the vessel cross-section for a plurality of positions along the vessel according to one or more example embodiments.

FIG. 2 shows a result of a material breakdown of the vessel cross-section for a plurality of positions along the vessel B on the basis of spectral computed tomography data. Each of the cells, in which the vessel wall W is shown, is a 2D view of a representation of the vessel wall W respectively. Each of the cells, in which the calcification C is shown, is a 2D view of a calcification map of the examination region A respectively. The cell, in which the peripheral region P is shown, forms an iodine map of the examination region A.

Figure 3:
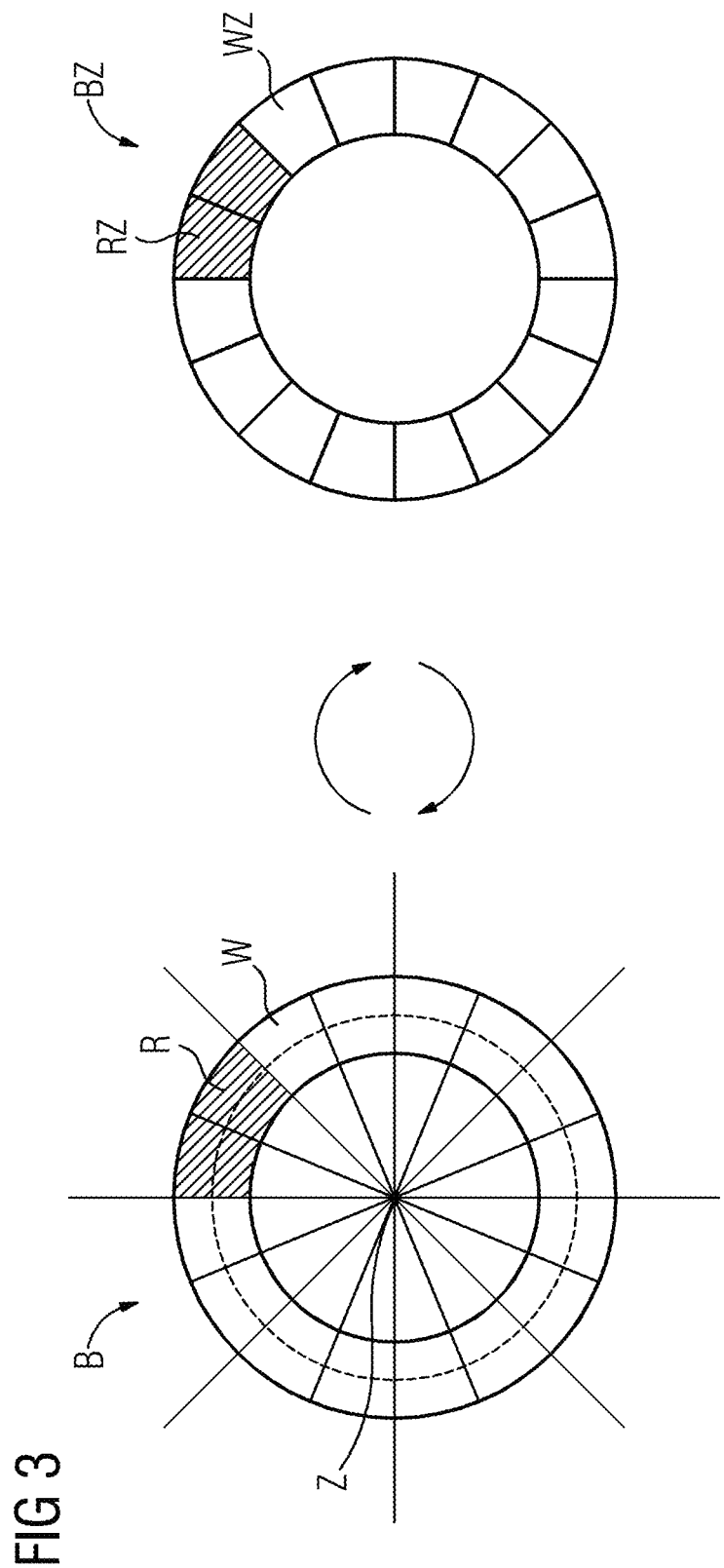
FIG. 3 shows examples of a representation of vessel wall-related data according to one or more example embodiments.

FIG. 3 shows examples of a representation of vessel wall-related data. The left-hand part of FIG. 3 shows a cross-section of the vessel B. The vessel wall W is arranged around the center line Z of the vessel B. The vessel wall W has a plurality of portions.

The vessel wall-related data is calculated in that for each portion of a plurality of portions of the vessel wall W, a parameter value, which the at least one parameter map assigns to this portion, is compared with a threshold value for the at least one parameter map respectively, wherein the vessel wall-related data for each portion of the plurality of portions of the vessel wall W comprises a result of the respective comparison.

In the portions R of the plurality of portions the parameter value, which the at least one parameter map assigns to this portion, is greater than a threshold value.

The right-hand part of FIG. 3 shows a transformed representation WZ of the vessel wall W. The representation WZ of the vessel wall W is based on a transformation in which a first region of transformed representation WZ of the vessel wall W is assigned to a first portion of the vessel wall W and a second region of the transformed representation WZ of the vessel wall W is assigned to a second portion of the vessel wall W, with the azimuthal arrangement of the first region of the transformed representation WZ being identical relative to the second region of the transformed representation WZ to the azimuthal arrangement of the first portion of the vessel wall W relative to the second portion of the vessel wall W.

The transformation takes place for all portions of the plurality of portions in such a way that the first region of the transformed representation WZ is situated radially further out than the second region of the transformed representation WZ if the first portion of the vessel wall W is situated further downstream in relation to a center line Z of the vessel B than the second portion of the vessel wall W.

A portion of the transformed representation WZ, which is accordingly situated radially further out, respectively is thus assigned to each portion of the vessel wall W, which is situated further downstream in relation to the center line Z of the vessel B. Such a transformation is also applied to the at least one parameter map. The vessel wall-related data can be represented as an overlaying BZ of the transformed representation WZ of the vessel wall W and the at least one transformed parameter map. In the portions RZ of the plurality of portions of the transformed representation WZ the parameter value, which the at least one transformed parameter map assigns to this portion, is greater than a threshold value. A change in the parameter value from one portion of the vessel wall W to another portion of the vessel wall W along the center line Z of the vessel B can be represented therewith in a static two-dimensional view.

FIG. 4 shows a representation of vessel wall-related data of the same vessel B for a plurality of successive instants T1, T2, T3, with the vessel wall-related data having been calculated on the basis of an overlaying of the representation of the vessel wall W and the at least one parameter map. It is possible to see therein how the number of portions R, in which the parameter value assigned by the at least one parameter map is greater than a threshold value, changes over time.

Figure 5:
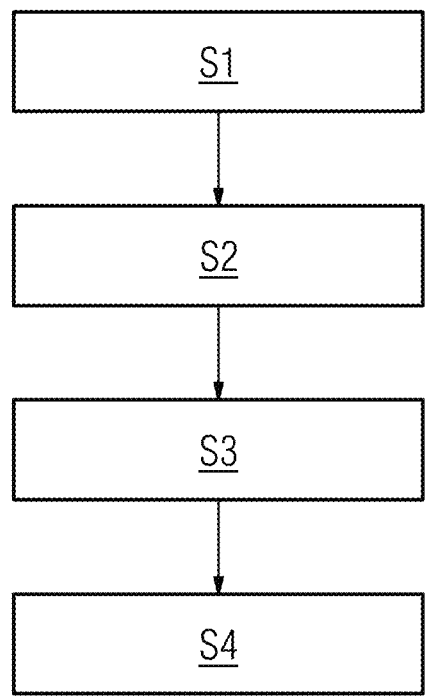
FIG. 5 shows a flowchart of a method for providing vessel wall-related data according to one or more example embodiments.

FIG. 5 shows a flowchart of a method for providing vessel wall-related data, the method comprising:

- receiving S1 spectral computed tomography data of an examination region A, wherein the examination region A has a vessel B,
- calculating S2 a representation of the vessel wall W of the vessel B and at least one parameter map of the examination region A on the basis of the spectral computed tomography data,
- calculating S3 the vessel wall-related data on the basis of the representation of the vessel wall W and the at least one parameter map of the examination region A,
- providing S4 the vessel wall-related data.

Figure 6:
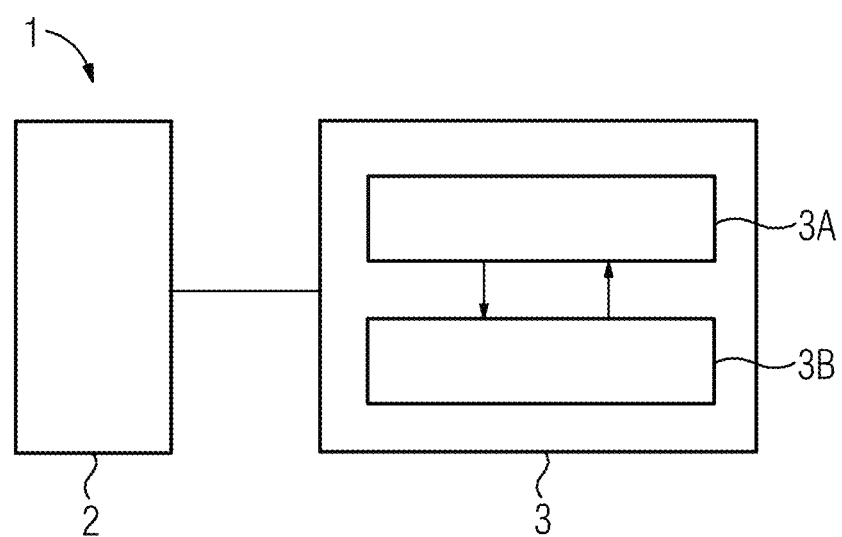
FIG. 6 shows a medical imaging system according to one or more example embodiments.

FIG. 6 shows a medical imaging system 1, having the data processing system 3 and a computed tomography device 2 for capturing the spectral computed tomography data. The data processing system 3 for providing vessel wall-related data has a data interface 3A and a processor 3B and is adapted to carry out the method shown in FIG. 5.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein and mentioned above, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium, storage means or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been described in detail with reference to example embodiments, the present invention is not limited by the disclosed examples from which the skilled person is able to derive other variations without departing from the scope of the invention.

The invention claimed is:

1. A method for providing vessel wall-related data, the method comprising:
   receiving spectral computed tomography data of an examination region, the examination region having a vessel and the spectral computed tomography data including contrast medium-assisted spectral computed tomography angiography data of the vessel;
   calculating a representation of a vessel wall of the vessel and at least one parameter map of the examination region based on the contrast medium-assisted spectral computed tomography angiography data;
   calculating the vessel wall-related data based on the representation of the vessel wall and the at least one parameter map of the examination region; and
   providing the vessel wall-related data.

2. The method of claim 1, wherein the vessel is a blood vessel.

3. The method of claim 2, wherein the calculating the vessel wall-related data calculates the vessel wall-related data based on an overlaying of the representation of the vessel wall and the at least one parameter map.

4. The method of claim 1, wherein the calculating the vessel wall-related data calculates the vessel wall-related data based on an overlaying of the representation of the vessel wall and the at least one parameter map.

5. The method of claim 1, wherein the at least one parameter map of the examination region comprise at least one of a fat map or a water map.

6. The method of claim 1, wherein the at least one parameter map of the examination region comprises at least one of a calcification map, a density map or an iodine map.

7. The method of claim 1, further comprising:
   generating a wall elasticity model based on at least one of the vessel wall-related data, the wall elasticity model relating to an elasticity of the vessel wall of the vessel.

8. The method of claim 1, further comprising:
   generating a blood flow model based on the vessel wall-related data, the blood flow model relating to a blood flow through the vessel.

9. The method as claimed in claim 8, further comprising:
   determining a calcified vessel section based on the blood flow model and a calcification map, the calcified vessel section being upstream of a dissection of the vessel or a vascular suture of the vessel, and the calcification map being part of the at least one parameter map.

10. A non-transitory computer-readable storage medium, comprising instructions, when executed by a computer, cause the computer to perform the method of claim 1.

11. The method of claim 1, wherein the calculating the vessel wall-related data includes,
    for each portion of a plurality of portions of the vessel wall, comparing an assigned parameter value from the at least one parameter map to a threshold value for the at least one parameter map, the vessel wall-related data for each portion of the plurality of portions of the vessel wall including a result of the respective comparison.

12. The method of claim 11, further comprising:
    generating a wall elasticity model based on at least one of the vessel wall-related data, the wall elasticity model relating to an elasticity of the vessel wall of the vessel.

13. The method of claim 12, further comprising:
    generating a blood flow model based on the vessel wall-related data, the blood flow model relating to a blood flow through the vessel.

14. The method as claimed in claim 13, further comprising:
    determining a calcified vessel section based on the blood flow model and a calcification map, the calcified vessel section being upstream of a dissection of the vessel or a vascular suture of the vessel, and the calcification map being part of the at least one parameter map.

15. A method for providing vessel wall-related data, the method comprising:
    receiving spectral computed tomography data of an examination region, the examination region having a vessel;
    calculating a representation of a vessel wall of the vessel and at least one parameter map of the examination region based on the spectral computed tomography data;
    calculating the vessel wall-related data based on the representation of the vessel wall and the at least one parameter map of the examination region; and
    providing the vessel wall-related data,
    wherein the representation of the vessel wall is based on a transformation in which a first portion of a transformed representation of the vessel wall is assigned to a first portion of the vessel wall and a second portion of the transformed representation of the vessel wall is assigned to a second portion of the vessel wall,
an azimuthal arrangement of the first portion of the transformed representation relative to the second portion of the transformed representation is substantially identical to the azimuthal arrangement of the first portion of the vessel wall relative to the second portion of the vessel wall, and
the first portion of the transformed representation is radially further out than the second portion of the transformed representation if the first portion of the vessel wall is further downstream in relation to a center line of the vessel than the second portion of the vessel wall, or the first portion of the transformed representation is radially further out than the second portion of the transformed representation if the first portion of the vessel wall is further upstream in relation to a center line of the vessel than the second portion of the vessel wall.

16. A method for providing vessel wall-related data, the method comprising:
receiving spectral computed tomography data of an examination region, the examination region having a vessel;
calculating a representation of a vessel wall of the vessel and at least one parameter map of the examination region based on the spectral computed tomography data;
calculating the vessel wall-related data based on the representation of the vessel wall and the at least one parameter map of the examination region; and
providing the vessel wall-related data,
wherein the calculating the vessel wall-related data includes,
for each portion of a plurality of portions of the vessel wall, comparing an assigned parameter value from the at least one parameter map to a threshold value for the at least one parameter map, the vessel wall-related data for each portion of the plurality of portions of the vessel wall including a result of the respective comparison.

17. A data processing system configured to provide vessel wall-related data, the data processing system comprising:
a data interface; and
a processor, the processor configured to cause the data processing system to
receive spectral computed tomography data of an examination region, the examination region having a vessel and the spectral computed tomography data including contrast medium-assisted spectral computed tomography angiography data of the vessel,
calculate a representation of a vessel wall of the vessel and at least one parameter map of the examination region based on the contrast medium-assisted spectral computed tomography angiography data,
calculate the vessel wall-related data based on the representation of the vessel wall and the at least one parameter map of the examination region, and
provide the vessel wall-related data.

18. A medical imaging system, comprising:
the data processing system of claim 17; and
a computed tomography device configured to capture the spectral computed tomography data.

19. A data processing system configured to provide vessel wall-related data, the data processing system comprising:
a data interface; and
a processor, the processor configured to cause the data processing system to
receive spectral computed tomography data of an examination region, the examination region having a vessel,
calculate a representation of a vessel wall of the vessel and at least one parameter map of the examination region based on the spectral computed tomography data,
calculate the vessel wall-related data based on the representation of the vessel wall and the at least one parameter map of the examination region, and
provide the vessel wall-related data,
wherein the representation of the vessel wall is based on a transformation in which a first portion of a transformed representation of the vessel wall is assigned to a first portion of the vessel wall and a second portion of the transformed representation of the vessel wall is assigned to a second portion of the vessel wall,
an azimuthal arrangement of the first portion of the transformed representation relative to the second portion of the transformed representation is substantially identical to the azimuthal arrangement of the first portion of the vessel wall relative to the second portion of the vessel wall, and
the first portion of the transformed representation is radially further out than the second portion of the transformed representation if the first portion of the vessel wall is further downstream in relation to a center line of the vessel than the second portion of the vessel wall, or the first portion of the transformed representation is radially further out than the second portion of the transformed representation if the first portion of the vessel wall is further upstream in relation to a center line of the vessel than the second portion of the vessel wall.

20. A data processing system configured to provide vessel wall-related data, the data processing system comprising:
a data interface; and
a processor, the processor configured to cause the data processing system to
receive spectral computed tomography data of an examination region, the examination region having a vessel,
calculate a representation of a vessel wall of the vessel and at least one parameter map of the examination region based on the spectral computed tomography data,
calculate the vessel wall-related data based on the representation of the vessel wall and the at least one parameter map of the examination region, and
provide the vessel wall-related data,
wherein the processor further configured to cause the data processing system to,
for each portion of a plurality of portions of the vessel wall, compare an assigned parameter value from the at least one parameter map to a threshold value for the at least one parameter map, the vessel wall-related data for each portion of the plurality of portions of the vessel wall including a result of the respective comparison.

* * * * *